(12) United States Patent
Matsumoto

(10) Patent No.: US 11,063,347 B2
(45) Date of Patent: Jul. 13, 2021

(54) IN-CABIN COMMUNICATION SYSTEM COMPRISED OF A LEAKY COAXIAL CABLE FIXED TO A VEHICLE BODY

(71) Applicant: DENSO CORPORATION, Kariya (JP)

(72) Inventor: Munenori Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/594,838

(22) Filed: Oct. 7, 2019

(65) Prior Publication Data

US 2020/0036098 A1    Jan. 30, 2020

Related U.S. Application Data

(63) Continuation of application No. PCT/JP2018/011265, filed on Mar. 22, 2018.

(30) Foreign Application Priority Data

Apr. 11, 2017   (JP) .............................. JP2017-077935

(51) Int. Cl.
| | |
|---|---|
| H01Q 1/32 | (2006.01) |
| H01Q 13/20 | (2006.01) |
| H04W 4/48 | (2018.01) |
| H02G 15/02 | (2006.01) |
| H04B 5/00 | (2006.01) |

(52) U.S. Cl.
CPC ......... H01Q 1/3291 (2013.01); H01Q 13/203 (2013.01); H02G 15/025 (2013.01); H04B 5/0018 (2013.01); H04W 4/48 (2018.02)

(58) Field of Classification Search
CPC ...... H01Q 13/203; H01Q 13/20; H01Q 13/22; H01Q 13/28; H01Q 1/3283; H01Q 1/3291
USPC ......................................................... 333/237
See application file for complete search history.

(56) References Cited

U.S. PATENT DOCUMENTS

| | | | | |
|---|---|---|---|---|
| 2,710,946 A | * | 6/1955 | Grieg et al. .............. | H01P 3/08 |
| | | | | 333/245 |
| 4,053,835 A | * | 10/1977 | Breitenbach ............. | H01Q 1/48 |
| | | | | 455/129 |
| 2015/0171510 A1 | | 6/2015 | Hirose | |

FOREIGN PATENT DOCUMENTS

| | | |
|---|---|---|
| EP | 0722196 A1 | 7/1996 |
| JP | 2008049960 A | 3/2008 |
| JP | 2011146909 A | 7/2011 |
| JP | 5873926 B2 | 3/2016 |

* cited by examiner

*Primary Examiner* — Benny T Lee
(74) *Attorney, Agent, or Firm* — Harness, Dickey & Pierce, P.L.C.

(57) ABSTRACT

An in-cabin communication system performs wireless communication between a vehicle and a portable terminal carried by an occupant. The in-cabin communication system includes: a vehicular device mounted to the vehicle; and a leaky coaxial cable that is connected to the vehicular device, and that outputs an electromagnetic wave having a predetermined wavelength according to a command from the vehicular device. The leaky coaxial cable is disposed inside a steel plate of a body of the vehicle. The leaky coaxial cable is disposed at a predetermined distance, which corresponds to an integer multiple of a half-wavelength of the predetermined wavelength, from the steel plate.

4 Claims, 5 Drawing Sheets

IN-CABIN COMMUNICATION SYSTEM COMPRISED OF A LEAKY COAXIAL CABLE FIXED TO A VEHICLE BODY

CROSS REFERENCE TO RELATED APPLICATIONS

The present application is a continuation application of International Patent Application No. PCT/JP2018/011265 filed on Mar. 22, 2018, which designated the U.S. and claims the benefit of priority from Japanese Patent Application No. 2017-077935 filed on Apr. 11, 2017. The entire disclosures of all of the above applications are incorporated herein by reference.

TECHNICAL FIELD

The present disclosure relates to an in-cabin communication system.

BACKGROUND

Portable terminals such as a smartphone have been used widely. It may be possible to perform wireless communication between the portable terminal and a vehicle for providing a service to a portable terminal carried by an occupant.

SUMMARY

The present disclosure describes an in-cabin communication system for performing wireless communication between a vehicle and a portable terminal carried by an occupant.

BRIEF DESCRIPTION OF DRAWINGS

The above and other objects, features and advantages of the present disclosure will become more apparent from the following detailed description made with reference to the accompanying drawings.

DETAILED DESCRIPTION

A leaky coaxial cable may be used as an antenna to transmit an electromagnetic wave to the portable terminal or receive the electromagnetic wave from the portable terminal. The leaky coaxial cable is a coaxial cable having a slit at a side surface. It may be possible to transmit or receive the electromagnetic wave through the slit. In a situation where such a leaky coaxial cable is used as an antenna, it may be possible to transmit or receive the electromagnetic wave through a variety of positions or angles. Thus, it may be possible to ensure the stability of a communication state.

In a situation where the leaky coaxial cable is used as an antenna, electromagnetic waves may be transmitted or received through the respective plural positions. Thus, power may be easily consumed.

In one or more of embodiments in the present disclosure, it may be possible to suppress the power consumption in a situation of using the leaky coaxial cable as an antenna.

An in-cabin communication system according to an aspect of the present disclosure includes: a vehicular device that is mounted to a vehicle; and a leaky coaxial cable that outputs an electromagnetic wave having a predetermined wavelength according to a command from the vehicular device. Thus, it may be possible to perform wireless communication with a portable device carried by an occupant through the leaky coaxial cable. Additionally, the leaky coaxial cable is disposed inside a steel plate of a body of the vehicle. The gap between the leaky coaxial cable and the steel plate has a predetermined distance corresponding to an integer multiple of the half-wavelength of the electromagnetic wave output from the leaky coaxial cable.

Since the leaky coaxial cable is disposed at a predetermined distance corresponding to an integer multiple of the half-wavelength from the steel plate, the electromagnetic wave from the leaky coaxial cable towards the steel plate forms an antinode at a location where the electromagnetic wave is propagated to the steel plate. Accordingly, it may be possible to suppress a vibration at a time of the electromagnetic wave propagating to the steel plate. Thus, it may be possible to suppress an energy loss of the electromagnetic wave at the steel plate. As a result, it may be possible to suppress power consumption.

The following describes embodiments to clarify the contents of the present disclosure described above.

(A. System Configuration)

Figure 1:
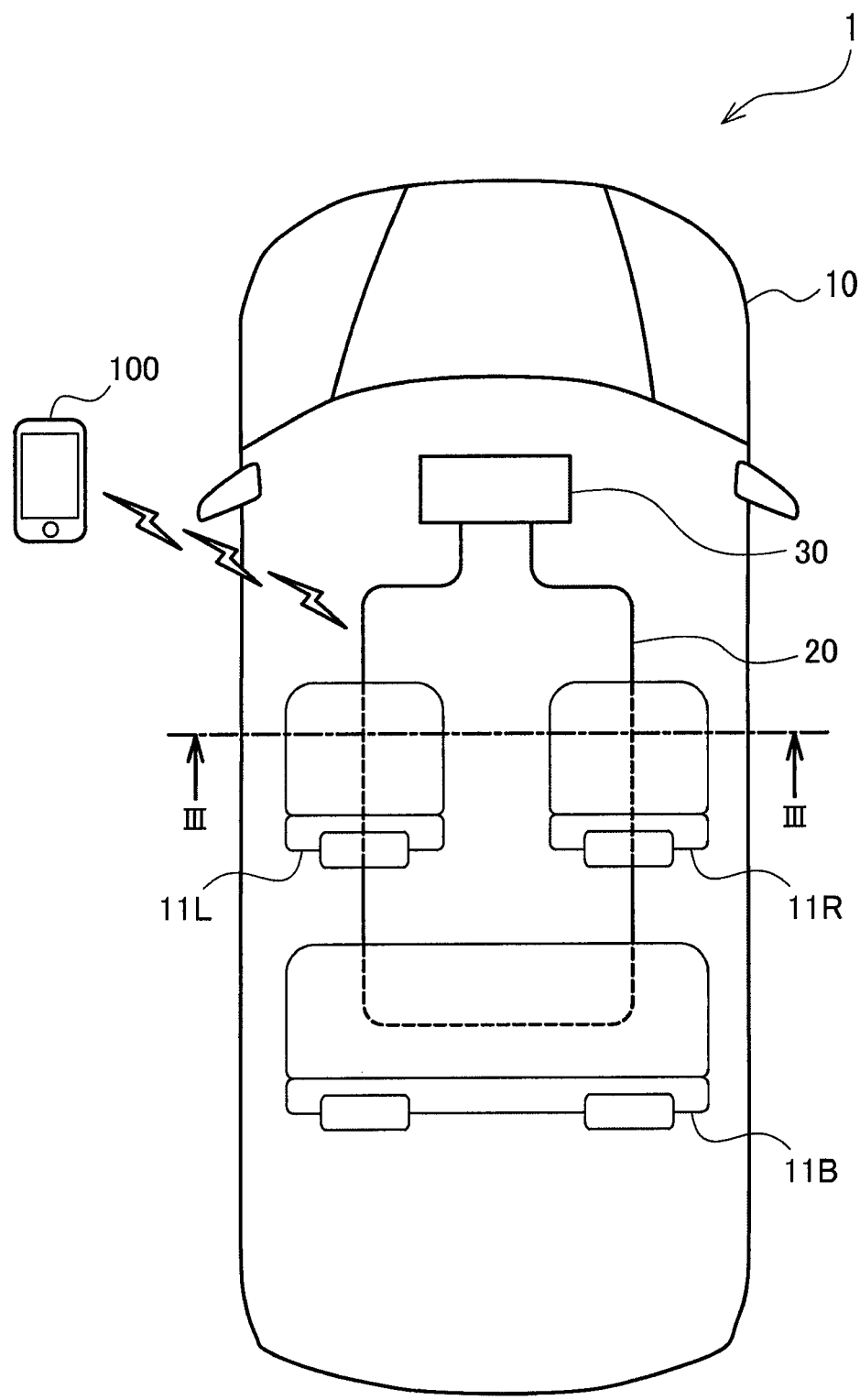
FIG. 1 illustrates a configuration of an in-cabin communication system.

FIG. 1 illustrates a configuration of an in-cabin communication system 1 for performing wireless communication between a portable terminal 100, which is carried by an occupant inside a vehicle cabin, and a vehicle 10.

The portable terminal 100 includes, for example, a terminal-side antenna (not shown) disposed at the portable terminal for performing wireless communication with the vehicle 10 or the like, and a controller (not shown) connected to the terminal-side antenna. The controller can transmit an electromagnetic wave from the terminal-side antenna, and the controller can receive the electromagnetic wave through the terminal-side antenna.

The vehicle 10 is equipped with the leaky coaxial cable 20. The leaky coaxial cable 20 as a vehicle-side antenna can be disposed at the vehicle performs wireless communication with the portable terminal 100. The leaky coaxial cable has an opening portion called a slot at the side surface of the coaxial cable. The electromagnetic wave may be transmitted and received through the slot. Therefore, the leaky coaxial cable functions as the antenna.

As illustrated in FIG. 1, the leaky coaxial cable 20 is disposed around the vehicle cabin (for example, through the bottom of a driver seat 11R, the bottom of a driver assistant seat 11L and the bottom of a rear seat 11B in the present embodiment). As described above, the leaky coaxial cable 20 is disposed inside the vehicle cabin. Thus, it may be possible to transmit and receive through a variety of positions or angles with respect to the portable terminal 100, which is carried by an occupant at each seat. As a result, it may be possible to ensure the stability of a communication state.

In the present embodiment, although the leaky coaxial cable 20 is disposed under or right under each seat, the leaky coaxial cable 20 may also be disposed above each seat or at the lateral side of each seat.

The leaky coaxial cable 20 is connected to a vehicular device 30. The vehicular device 30 may transmit the electromagnetic wave from the leaky coaxial cable 20, and may receive the electromagnetic wave from the leaky coaxial cable 20.

Figure 2A:
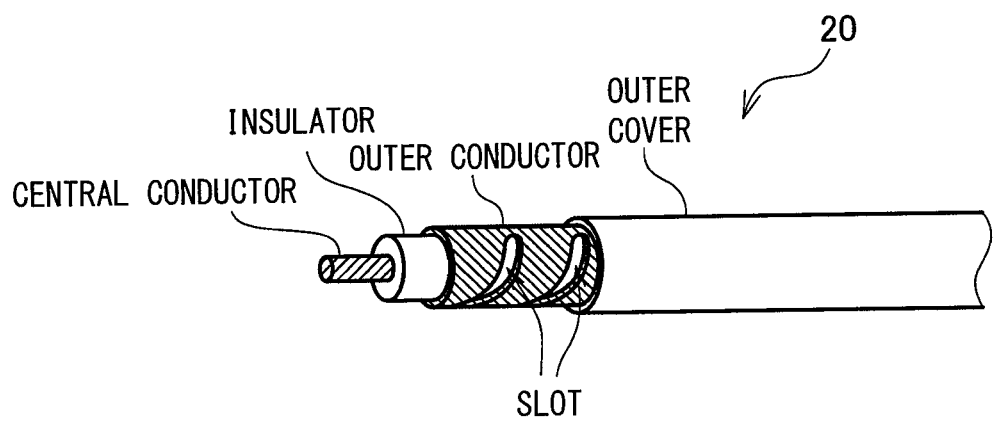
FIG. 2A conceptually illustrates that an electromagnetic wave is output from a leaky coaxial cable.

An internal structure of the leaky coaxial cable 20 is illustrated in FIG. 2A. As illustrated in FIG. 2A, the leaky coaxial cable 20 has a central conductor made of copper wire or the like as a core wire. The core wire is covered by an insulator such as polyethylene, an outer conductor such as a metal foil, and an outer cover such as vinyl. The slots are formed at regular intervals at the outer conductor. Accordingly, the electromagnetic wave is emitted to the insulator portion in response to that current flows through the central conductor, and the electromagnetic wave is output from a portion where the slots are provided.

Figure 2B:
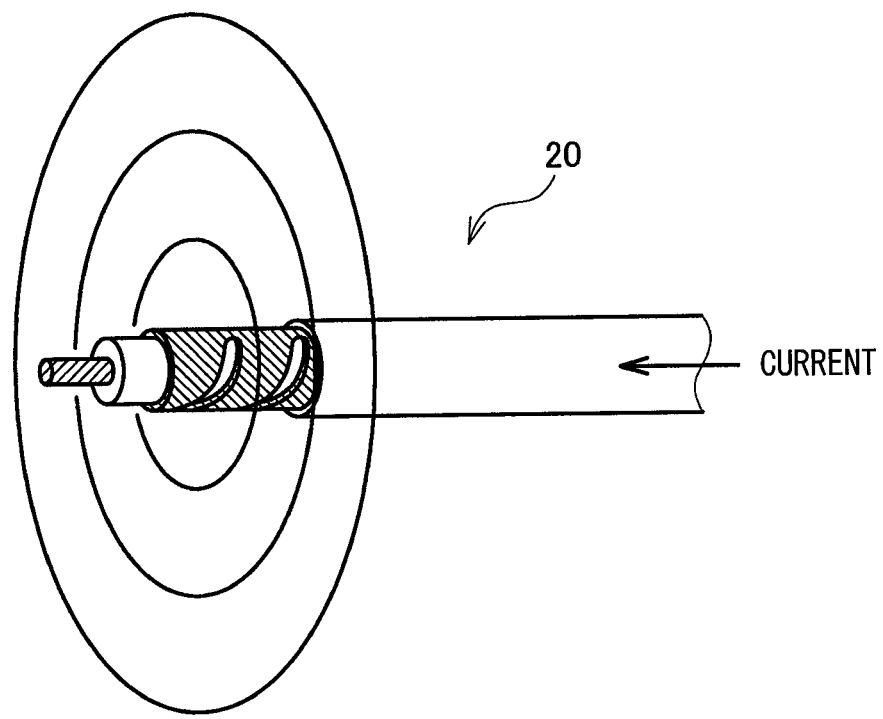
FIG. 2B conceptually illustrates that the electromagnetic wave is output from the leaky coaxial cable.

FIG. 2B illustrates that the electromagnetic wave is output in response to that current flows through the central conductor of the leaky coaxial cable 20. As illustrated in FIG. 2B, the electromagnetic wave is output in a direction perpendicular to the leaky coaxial cable 20. When the electromagnetic wave is received from the slot, the current flows through the central conductor because of electromagnetic induction. Thus, the electromagnetic wave may be transmitted or received through the leaky coaxial cable 20.

(B. Mode of Disposing Leaky Coaxial Cable)

Figure 3:
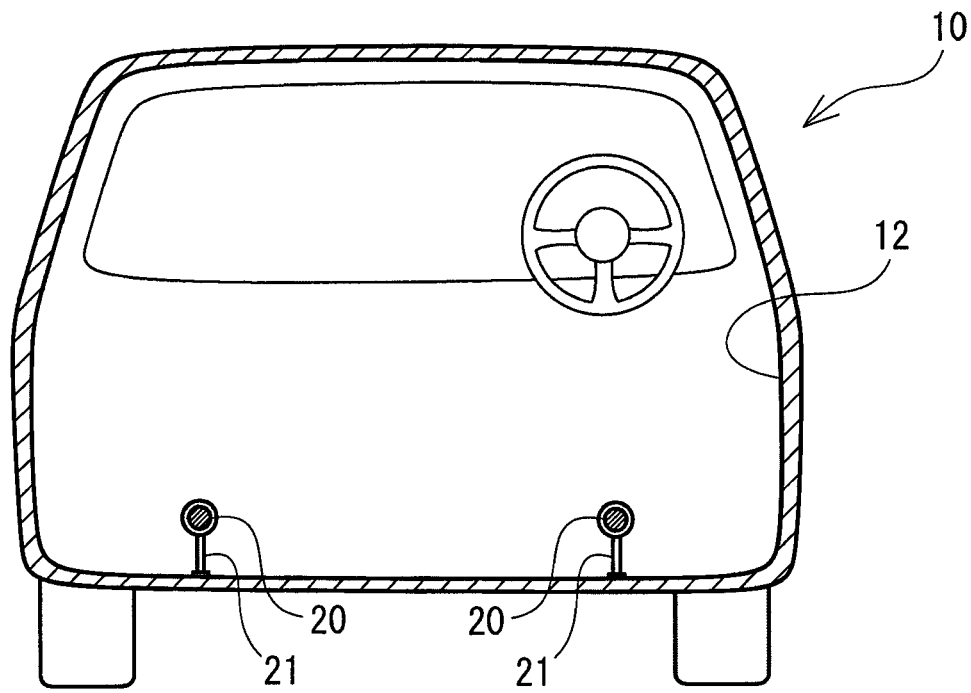
FIG. 3 illustrates an arrangement of the leaky coaxial cable.

FIG. 3 is a cross-sectional view taken along a line III-III in FIG. 1 that illustrates an arrangement of the leaky coaxial cable 20 in the vehicle. As illustrated in FIG. 3, the vehicle 10 has a body 12 formed of a steel plate (for example, an iron plate or a stainless steel plate). The leaky coaxial cable 20 is disposed inside the body 12 of the vehicle 10. The leaky coaxial cable 20 is fixed to the body 12 by a fixing member 21.

Figure 4:
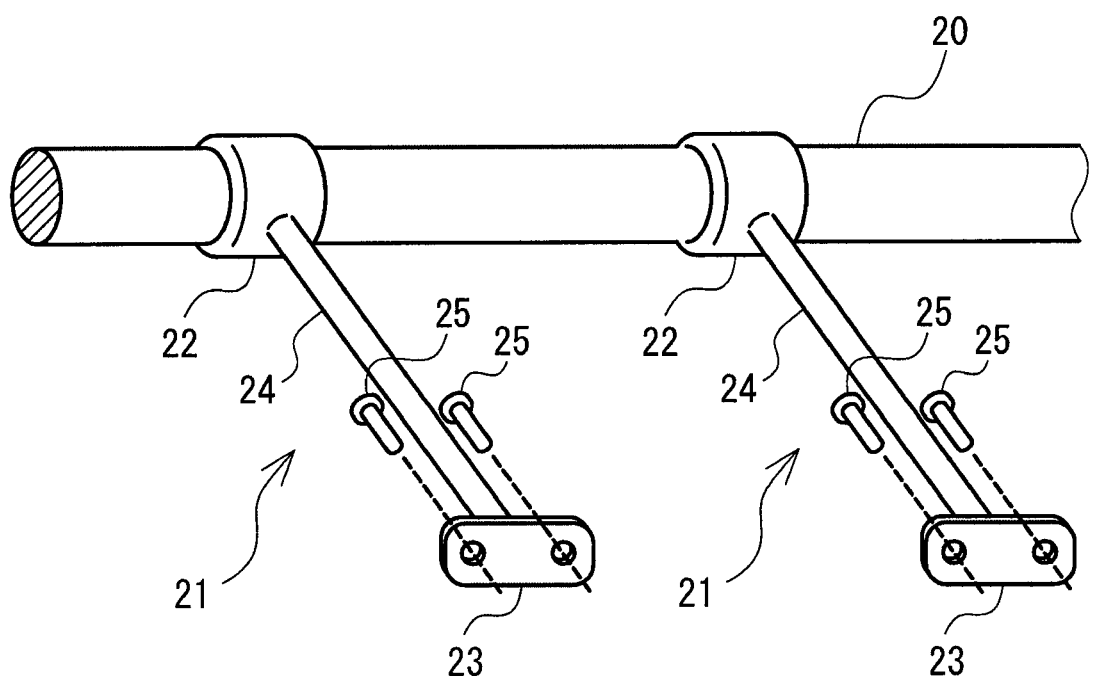
FIG. 4 illustrates a fixing member for fixing the leaky coaxial cable to a vehicle.

FIG. 4 illustrates the fixing member 21 for fixing the leaky coaxial cable 20 to the body 12 in FIG. 3. The fixing member 21 has a attaching portion 22 attached to the leaky coaxial cable 20, a fixing portion 23 fixed to the body 12 of the vehicle 10 in FIG. 3, and a connecting portion 24 connecting the attaching portion 22 and the fixing portion 23.

The attaching portion 22 is formed in a tubular shape to be fitted with the leaky coaxial cable 20. In the present embodiment, the leaky coaxial cable 20 is provided with the fixing member 21, and the fixing member 21 is fitted to the leaky coaxial cable 20 in advance, and then is attached to the leaky coaxial cable 20. Accordingly, it may be possible to install the leaky coaxial cable 20 in the vehicle 10 in FIG. 3 only by fixing the fixing member 21 to the vehicle 10.

The fixing portion 23 is formed in a plate shape. The fixing portion 23 has the predetermined number of screw holes into which respective screws 25 are inserted. For example, the fixing portion 23 has two screw holes in the present embodiment. The fixing portion 23 is attached to the leaky coaxial cable 20. The fixing portion 23 may be fixed to the body 12 of the vehicle 10 by inserting the screw 25 into the screw hole and fastening the screw 25 to the body 12 of the vehicle 10.

The attaching portion 22 and the fixing portion 23 are connected by the connecting portion 24. The attaching portion 22 and fixing portion 23 are separated by a gap having a predetermined distance. Accordingly, it may be possible to dispose the leaky coaxial cable 20 to be separated from the body 12 by a predetermined distance, when the leaky coaxial cable 20 is fixed to the body 12 by the fixing member 21. The length of the connecting portion 24 is from the center (or central portion) of the leaky coaxial cable 20 to the bottom surface of the fixing portion 23. The length of the connecting portion 24 may be set to a length corresponding to a half-wavelength of the electromagnetic wave transmitted or received through the leaky coaxial cable 20. Alternatively, the length of the connecting portion 24 may be set to a length corresponding to an integer multiple of the half-wavelength of the electromagnetic wave.

Furthermore, the leaky coaxial cable 20 is fixed at plural locations by using plural fixing members 21. Therefore, the leaky coaxial cable 20 is disposed to be parallel to the body 12, so that the distance between the leaky coaxial cable 20 and the body 12 is constant.

Other modes for installing the leaky coaxial cable 20 in the vehicle 10 may also be applicable, as long as the leaky coaxial cable 20 is separated from the body 12 by a predetermined distance. For example, the leaky coaxial cable 20 may also be fixed to a portion (such as a seat) other than the body 12 at a position separated from the body 12 by a constant distance. Alternatively, an insulation member having a predetermined thickness may be attached to the body 12, and the leaky coaxial cable 20 may be disposed on the insulation member. Thus, the leaky coaxial cable 20 may be separated from the body 12.

The mode of preliminarily attaching the fixing member 21 to the leaky coaxial cable 20 is described in the present embodiment, the method of attaching the fixing member 21 to the body 12 at the time of installation may also be applicable.

The electromagnetic wave may be output toward an occupant sitting on the seat, when the leaky coaxial cable 20 is disposed as described above. The electromagnetic wave may not only be output in an upper direction where an occupant is present, but also may be output in directions other than the upper direction. Therefore, the electromagnetic wave may also be output to the lower side of the body 12 formed of the steel plate. When the electromagnetic wave is propagated to the steel plate, the current flows in the steel plate because of the electromagnetic induction. Thus, the energy of the electromagnetic wave may be accordingly lost. To suppress such power loss, the length of the connecting portion 24 of the fixing member 21 is set to the length as described above for the leaky coaxial cable 20 according to the present embodiment.

Figure 5A:
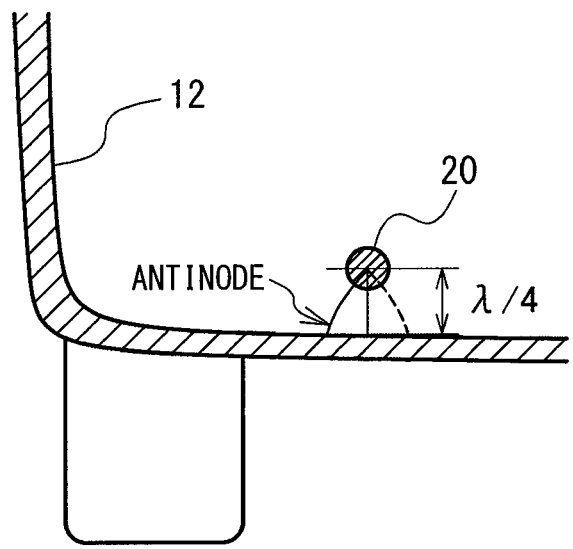
FIG. 5A illustrates the leaky coaxial cable disposed at a position where power loss increases.

FIG. 5A illustrates that the leaky coaxial cable 20 is disposed at a distance of $\lambda/4$ from the body 12. $\lambda$ is the wavelength of the electromagnetic wave output from the leaky coaxial cable 20. For example, in a situation of having wireless communication with the portable terminal by using Bluetooth (registered trademark), the frequency band around 2.4 GHz is used. Thus, the wavelength $\lambda$ is about 12.5 cm.

As illustrated in FIG. 5A, in a situation where the leaky coaxial cable 20 is disposed at a distance of $\lambda/4$ (about 3.125 cm in the present embodiment) from the body 12, an antinode of the electromagnetic wave is formed at a location where the electromagnetic wave is propagated to the steel plate. Accordingly, the amplitude of the electromagnetic wave increases at a location where electromagnetic wave is propagated to the steel plate. The power loss may increase, since a value of current generated inside the steel plate by the electromagnetic wave also increases.

Figure 5B:
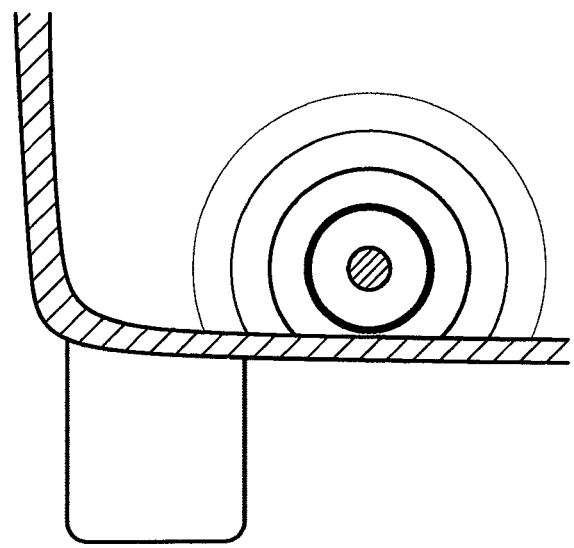
FIG. 5B illustrates the leaky coaxial cable disposed at a position where the power loss increases.

FIG. 5B illustrates the intensity of the electromagnetic wave when the leaky coaxial cable 20 is disposed at a distance of λ/4 from the body 12 as shown in FIG. 5A. As shown in FIG. 5B, the intensity of the electromagnetic wave significantly decreases after the electromagnetic wave is propagated to the body 12. Accordingly, it may be required to increase the power supplied to the leaky coaxial cable 20 to propagate to the portable terminal 100 located further away as shown in FIG. 1.

Figure 6A:
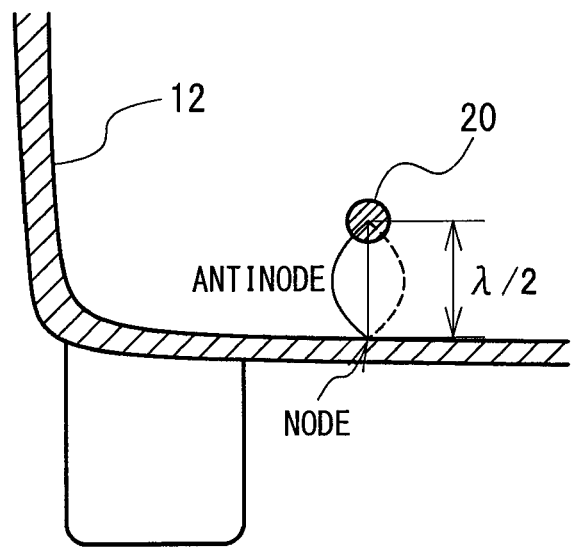
FIG. 6A illustrates the leaky coaxial cable disposed at a position where the power loss decreases.

FIG. 6A illustrates that the leaky coaxial cable 20 is disposed at a distance of λ/2 (about 6.25 cm in the present embodiment) from the body 12. As illustrated in FIG. 6A, in this situation, a node of the electromagnetic wave is formed precisely at a location where the electromagnetic wave is propagated to the steel plate and an antinode of the electromagnetic wave is formed at a location apart from the steel plate. Therefore, the amplitude of the electromagnetic wave decreases at a location where the electromagnetic wave is propagated to the steel plate. It may be possible to suppress the value of the current generated inside the steel plate by the electromagnetic wave. As a result, it may be possible to suppress the power loss.

Figure 6B:
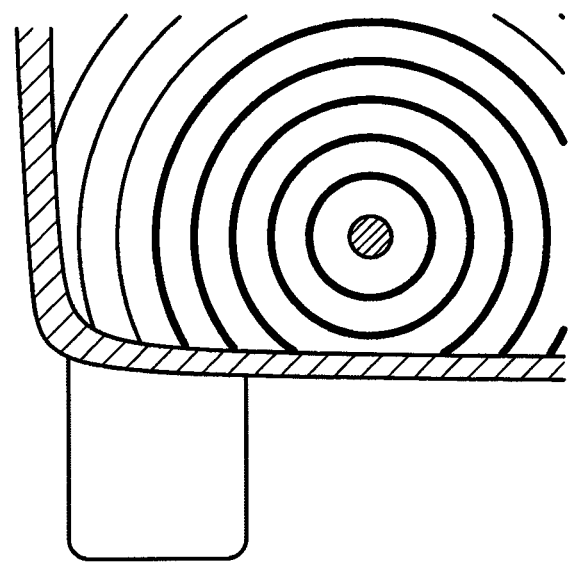
FIG. 6B illustrates the leaky coaxial cable disposed at a position where the power loss decreases.

FIG. 6B illustrates the intensity of the electromagnetic wave when the leaky coaxial cable 20 is disposed at a distance of λ/2 from the body 12 as shown in FIG. 6A. FIG. 6B illustrates that a decrease in the intensity of the electromagnetic wave is suppressed, even after the electromagnetic wave arrives at the body 12. The electromagnetic wave may be propagated further. Therefore, it may be possible to cause the electromagnetic wave to propagate to the portable terminal 100 while suppressing the power supplied to the leaky coaxial cable 20.

The node of the electromagnetic wave exists every half-wavelength. The electromagnetic wave is output from the leaky coaxial cable 20. In order to form a node when the electromagnetic wave, which is output from the leaky coaxial cable 20, arrives at the steel plate, the leaky coaxial cable 20 may be disposed at a distance of λ/2 from the body 12. Alternatively, the leaky coaxial cable 20 may be disposed to be at a distance of an integer multiple of the half-wavelength of the electromagnetic wave output from the leaky coaxial cable 20.

In the in-cabin communication system 1 according to the above embodiment, the leaky coaxial cable 20 is used as an antenna for performing wireless communication with the portable terminal 100 carried by an occupant as shown in FIG. 1. The leaky coaxial cable 20 is disposed inside the body 12 of the vehicle 10 as shown in FIG. 3. The gap between the leaky coaxial cable 20 and the body 12 is an integer multiple of the half-wavelength of the electromagnetic wave output from the leaky coaxial cable 20 as shown in FIG. 6A. A node is formed at a location where the electromagnetic wave, which is output from the leaky coaxial cable 20, arrives at the body 12. Accordingly, since the vibration at a time of the electromagnetic wave propagating to the steel plate may be suppressed, it may be possible to suppress the loss of the energy of the electromagnetic wave at the steel plate. As a result, it may be possible to suppress power consumption.

In the in-cabin communication system 1 (FIG. 1) according to the present embodiment, the fixing member 21 is provided for fixing the leaky coaxial cable 20 to the body 12 as shown in FIG. 3. The fixing member 21 fixes the leaky coaxial cable 20 to separate the leaky coaxial cable 20 from the body 12 with a gap having a predetermined distance, which is an integer multiple of the half-wavelength of the electromagnetic wave. Accordingly, when wiring and fixing the leaky coaxial cable 20 to the body 12 with the fixing member 21, it may be possible to dispose the leaky coaxial cable 20 at a predetermined distance from the steel plate without measuring the distance from the steel plate. Therefore, it may be possible to wire the leaky coaxial cable 20 easily.

In the in-cabin communication system 1 according to the present embodiment, the leaky coaxial cable 20 is disposed to be parallel to the body 12 as shown in FIG. 3. Accordingly, the respective electromagnetic waves output from plural positions of the leaky coaxial cable 20 form corresponding nodes precisely at a location where the electromagnetic waves arrive at the body 12. Thus, it may be possible to suppress the power loss in a wider range.

In the in-cabin communication system 1 according to the present embodiment, the leaky coaxial cable 20 is disposed right under the seats as shown in FIG. 1. For this reason, the wiring is less noticeable.

Although there is only one leaky coaxial cable 20 disposed in the in-cabin communication system 1 according to the above embodiment as shown in FIG. 1, plural leaky coaxial cables may also be disposed. For example, one leaky coaxial cable may be disposed above each seat, and one leaky coaxial cable may be disposed under each seat. According to this configuration, it may be possible to receive the electromagnetic wave from both the upper side and the lower side of an occupant. Thus, the electromagnetic wave may be transmitted and received in a wider range. For example, it may be possible to easily transmit or receive the electromagnetic wave regardless of whether an occupant put the portable terminal 100 (FIG. 1) in a front pocket or a butt pocket.

Additionally, it may be possible to enlarge a range where the electromagnetic wave may be transmitted or received, by mounting an antenna different from the leaky coaxial cable 20.

Although the present embodiment and the modifications have been described above, the present disclosure may not be limited to the embodiments and the modifications described above, and may be implemented in various modes without departing from the spirit of the present disclosure.

What is claimed is:
1. An in-cabin communication system for performing wireless communication between a vehicle and a portable terminal carried by an occupant, the in-cabin communication system comprising:
   a vehicular device mounted to the vehicle;
   a leaky coaxial cable that is connected to the vehicular device, and that is configured to output an electromagnetic wave having a predetermined wavelength according to a command from the vehicular device; and
   a fixing member that is configured to fix the leaky coaxial cable inside a steel plate of a body of the vehicle to separate the leaky coaxial cable from the steel plate,
   wherein the fixing member includes:
      an attaching portion attached to the leaky coaxial cable;
      a fixing portion fixed to the steel plate of the body; and
      a connecting portion connecting the attaching portion and the fixing portion,
   wherein a length of the connecting portion is set so that a gap between the leaky coaxial cable and the steel plate has a predetermined distance corresponding to an integer multiple of a half-wavelength of the predetermined wavelength.

2. The in-cabin communication system according to claim 1,
   wherein the leaky coaxial cable is disposed to be parallel to the body of the vehicle.

3. The in-cabin communication system according to claim 1,
   wherein the leaky coaxial cable is disposed right under a plurality of seats in the vehicle.

4. The in-cabin communication system according to claim 1,
   wherein the integer multiple is one, such that the predetermined distance corresponds to the half-wavelength of the predetermined wavelength.

* * * * *